(12) United States Patent
Takashima et al.

(10) Patent No.: US 6,425,575 B1
(45) Date of Patent: Jul. 30, 2002

(54) SWITCHABLY CONTROLLED LIQUID SEALED TYPE VIBRATION ISOLATOR

(75) Inventors: Yukio Takashima; Tsutomu Hashimoto, both of Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/617,870

(22) Filed: Jul. 17, 2000

(30) Foreign Application Priority Data

Sep. 10, 1999 (JP) .......................................... 11-256996

(51) Int. Cl.⁷ ................................ F16F 5/00; F16F 9/06
(52) U.S. Cl. ................................................. 267/140.13
(58) Field of Search ........................ 267/140.14, 140.13, 267/140.12, 140.11, 140.15, 219

(56) References Cited

U.S. PATENT DOCUMENTS

| | | | | |
|---|---|---|---|---|
| 5,167,403 A | * | 12/1992 | Muramatsu et al. | ... 267/140.13 |
| 5,180,148 A | * | 1/1993 | Muramatsu | ............ 267/140.14 |
| 5,183,243 A | * | 2/1993 | Matsumoto | ............ 267/140.13 |
| 5,215,293 A | | 6/1993 | Muramatsu et al. | |
| 5,217,211 A | | 6/1993 | Ide et al. | |
| 5,246,212 A | | 9/1993 | Funahashi et al. | |
| 5,314,173 A | | 5/1994 | Ide et al. | |
| 5,560,592 A | * | 10/1996 | Shimoda et al. | ........ 267/140.13 |
| 5,620,168 A | | 4/1997 | Ohtake et al. | |
| 5,628,498 A | | 5/1997 | Nanno | |
| 5,632,472 A | | 5/1997 | Kato et al. | |
| 5,642,873 A | | 7/1997 | Kato | |
| 5,769,402 A | * | 6/1998 | Ide et al. | ............... 267/140.14 |
| 5,833,219 A | * | 11/1998 | Mellon | ................... 267/140.13 |
| 5,947,456 A | * | 9/1999 | Aoki | ...................... 267/140.14 |
| 5,992,833 A | * | 11/1999 | Tanahashi | .............. 267/140.14 |
| 6,082,718 A | * | 7/2000 | Yamada et al. | ........ 267/140.14 |
| 6,158,724 A | * | 12/2000 | Takashima et al. | .... 267/140.13 |

FOREIGN PATENT DOCUMENTS

| | | | |
|---|---|---|---|
| JP | 3292431 A | * | 12/1991 |
| JP | 4262138 A | * | 9/1992 |
| JP | 4370432 A | * | 12/1992 |
| JP | 4370435 A | * | 12/1992 |
| JP | 11-173372 | | 6/1999 |

* cited by examiner

Primary Examiner—Paul N. Dickson
Assistant Examiner—Melody M. Burch
(74) Attorney, Agent, or Firm—Jordan & Hamburg LLP

(57) ABSTRACT

A switched vibration isolator has an elastic base member fixed to a first fitting member, and a tubular member fixed the elastic base member. A partition device is disposed in the tubular member, and has an outer diameter, a first partition side opposing the elastic base member defining a main liquid chamber therebetween, and a second partition side opposite the first partition side. The partition device an orifice communicating with the main liquid chamber. A partition receiving plate has a diameter greater than an outer diameter of the partition device and the partition device is mounted thereon. A diaphragm is disposed opposing the partition receiving plate and defining an auxiliary liquid chamber communicated with the main liquid chamber via the orifice. The partition receiving plate and the diaphragm are fixed in place together by an end of the tubular member.

19 Claims, 4 Drawing Sheets

SWITCHABLY CONTROLLED LIQUID SEALED TYPE VIBRATION ISOLATOR

BACKGROUND OF THE INVENTION

This invention relates to a switchably controlled liquid sealed type vibration isolator used to support a power unit, such as an automobile engine in a vibration isolating manner.

A switchably controlled liquid sealed type vibration isolator adapted to switch vibration isolating characteristics thereof in accordance with two kinds of vibrations in different frequency regions, such as shaking vibration and idling vibration, has been proposed as a liquid sealed type vibration isolator for use as a mount for supporting a vibrating body, such as an automobile engine, etc. so as not to have the vibration of the vibrating body transmitted to a body of a vehicle.

For example, Japanese Patent Laid-Open No. 173372/1999 proposes a switchably controlled liquid sealed type vibration isolator including a metal fixing member on a side of a vibration source, an outer cylindrical metal member on a side of a support, a vibration isolating base member interposed between the two metal members and formed of an elastic rubber member, a first diaphragm fixed to the outer cylindrical metal member so as to be opposed to the vibration isolating base member, and a partition provided between the diaphragm and vibration isolating base member, the partition and vibration isolating base member defining a main liquid chamber therebetween, the partition and first diaphragm forming therebetween a first auxiliary liquid chamber communicating with the main liquid chamber via a first orifice, the partition being provided at a main liquid chamber-side portion thereof with a second auxiliary liquid chamber communicating with the main liquid chamber via a second orifice, and an atmospheric pressure and negative pressure change-over chamber separated from the second auxiliary chamber via a second diaphragm.

In this proposed liquid sealed type vibration isolator, the partition is formed of a main partition member defining the first orifice on an outer circumference thereof, and a partition plate member defining the second auxiliary chamber and orifice. The main partition member, to which the second diaphragm is fixed, forms the change-over chamber on the main liquid chamber-side portion and is fitted in an inner circumference of the outer cylindrical metal member. The partition plate member is fitted around the diaphragm to hold a circumferential edge portion thereof. Both the main partition member and partition plate member are installed held between a main liquid chamber-side surface of the vibration isolating base member and a liquid chamber-side stepped portion of the outer cylindrical metal member.

However, in the above-mentioned construction, the main partition member and partition plate member have to be installed submerged in a liquid in order by a press fitting method as orifice-communicating openings of both thereof are positioned. Therefore, the structure to be assembled is complicated, and, moreover, a high stability of the structure is rarely obtained due to variations in accuracy of other parts.

The main partition member and partition plate member are held between the vibration isolating base member and the liquid chamber-side stepped portion of the outer cylindrical metal member and thereby retained in a mere contacting state. Therefore, the predetermined functions become unable to be fulfilled due to changes with the lapse of time in the condition of the parts during the use of the vibration isolator in a vehicle-mounted state. Such changes are ascribed to the fluctuation of a liquid pressure caused by the vibration of the vibration isolating base member, or permanent set in fatigue and slip of the rubber portions between the parts caused by the heat. The changes thus cause the sealing to become insufficient, and the passages working as the orifices to be short-circuited.

The present invention has been made in view of these facts, and provides a switchably controlled liquid sealed type vibration isolator having a structure which permits an inner partition, by which an inner hollow space is divided into a main liquid chamber and two auxiliary liquid chambers, to be assembled tentatively in an air environment, plural constituent parts to be combined together reliably and easily without being dislocated, and, moreover, the relative displacement of the constituent parts which occurs due to changes with the lapse of time of themselves in a vehicle-mounted state to be reduced to a low level, whereby retention of an excellent sealed condition among the parts and the improvement of the durability of the same parts are attained.

SUMMARY OF THE INVENTION

The present invention provides a switchably controlled liquid sealed type vibration isolator including a vibration isolating base member formed of an elastic rubber member, a first metal fixing member combined with one of upper and lower portions of the vibration isolating base member, a main cylindrical metal member combined with the other portion of the vibration isolating base member, a first diaphragm fixed to the main metal member so as to be opposed to the vibration isolating base member, a partition provided between the vibration isolating base member and first diaphragm, a main liquid chamber formed between the partition and vibration isolating base member, a first auxiliary liquid chamber formed between the partition and first diaphragm, a second auxiliary liquid chamber formed on a main liquid chamber-side portion of the partition, a change-over chamber separated from the second auxiliary chamber via a second diaphragm and capable of receiving therein an atmospheric pressure and a negative pressure in a switchable manner, and first and second orifices communicating the main liquid chamber with the first and second auxiliary chambers respectively, the vibration isolator further having the following structure so as to solve the aforementioned problems.

The partition has at an outer circumferential portion thereof a main partition member forming the first orifice, and the second diaphragm is provided on a main liquid chamber side portion of the main partition member so as to form the change-over chamber in a diametrically inner portion thereof. A partition plate member pressing a circumferential portion of the second diaphragm toward the main partition member to form the second auxiliary liquid chamber between the partition plate member and the same diaphragm is engaged with and fitted firmly around an outer circumferential portion of the main partition member by a swaging device for this outer circumferential portion. A portion defined by the main partition member and partition plate member on an outer side of the second auxiliary liquid chamber is formed as the second orifice. A partition receiving plate having an outer circumferential edge portion extending outward beyond an outer end of the main partition member is fixed by a press fitting device with respect to the main partition member to the portion of the main partition member which is on the side of the first auxiliary liquid chamber. The partition plate member is fitted liquid-tightly in an inner circumferential portion of the main metal member, and the outer circumferential edge portion of the partition receiving plate is fixed with the first diaphragm to the main metal member by a swaging member.

According to the liquid-sealed type vibration isolator of-this construction, the structural parts of the partition incorporated in an inner portion thereof, i.e. the main partition member on an outer circumferential side of which the first orifice is formed, the second diaphragm forming the change-over chamber on the portion thereof which is on the side of the main liquid chamber, the partition plate member forming the second auxiliary chamber and orifice, and parts of the partition receiving plate can be combined together in the air initially with ease and separately from the main metal member without causing these members and parts to be dislocated. Therefore, after such a temporary combining operation, plural structural parts can be combined accurately by press fitting the partition plate member of the partition firmly into an inner circumference of the main metal member, and then swaging the outer circumferential portion of the partition receiving plate with the first diaphragm to the main metal member, whereby a liquid sealed type vibration isolator provided with two auxiliary liquid chambers, two orifices and two diaphragms can be assembled easily.

Especially, since the partition plate member pressing the second diaphragm to form the second auxiliary liquid chamber and orifice is fitted firmly in an engaged state around the outer circumference of the main partition member by a swaging device for the same outer circumference, the main partition member and the main partition plate member are combined with each other without a fear of their being separated from each other. This enables the second diaphragm to be pressed reliably, and can prevent an excessive decrease in the sealability of the parts and the short-circuiting of the passage as an orifice which are ascribed to changes with the lapse of time in the vibration isolating base member during the use thereof.

In this liquid sealed type vibration isolator, a second metal fixing member covering a space on the outer side of the first diaphragm is provided, which is swaged with the partition receiving plate and first diaphragm to the main metal member, and these parts can also be combined together easily just as the above-mentioned parts.

In the liquid sealed type vibration isolators of each of the above-described inventions, the main partition member is provided on the portion of an outer circumference thereof which is on the side of the first auxiliary liquid chamber with an orifice-forming recess, which are defined by the partition receiving plate and main metal member to form the first orifice. Therefore, the main partition member can be manufactured easily, and is suitable for practicing the vibration isolator.

The partition plate member is preferably formed by fitting firmly the outer circumferential portion thereof around the outer circumference of the portion of the main partition member which is on the side of the main liquid chamber, bending at least a part of a circumferential end portion of the partition plate member inward in the above-mentioned orifice-forming recess, and swaging this bent portion to the main partition member. This enables the partition plate member to be swaged by utilizing the orifice-forming recess.

The circumferential end portion of the partition plate member can be swaged at plural circumferentially spaced parts thereof to the main partition member, and also at substantially all parts of the circumference thereof to the same member.

DETAILED DESCRIPTION OF THE PREFERRED EMBODIMENTS

Figure 1:
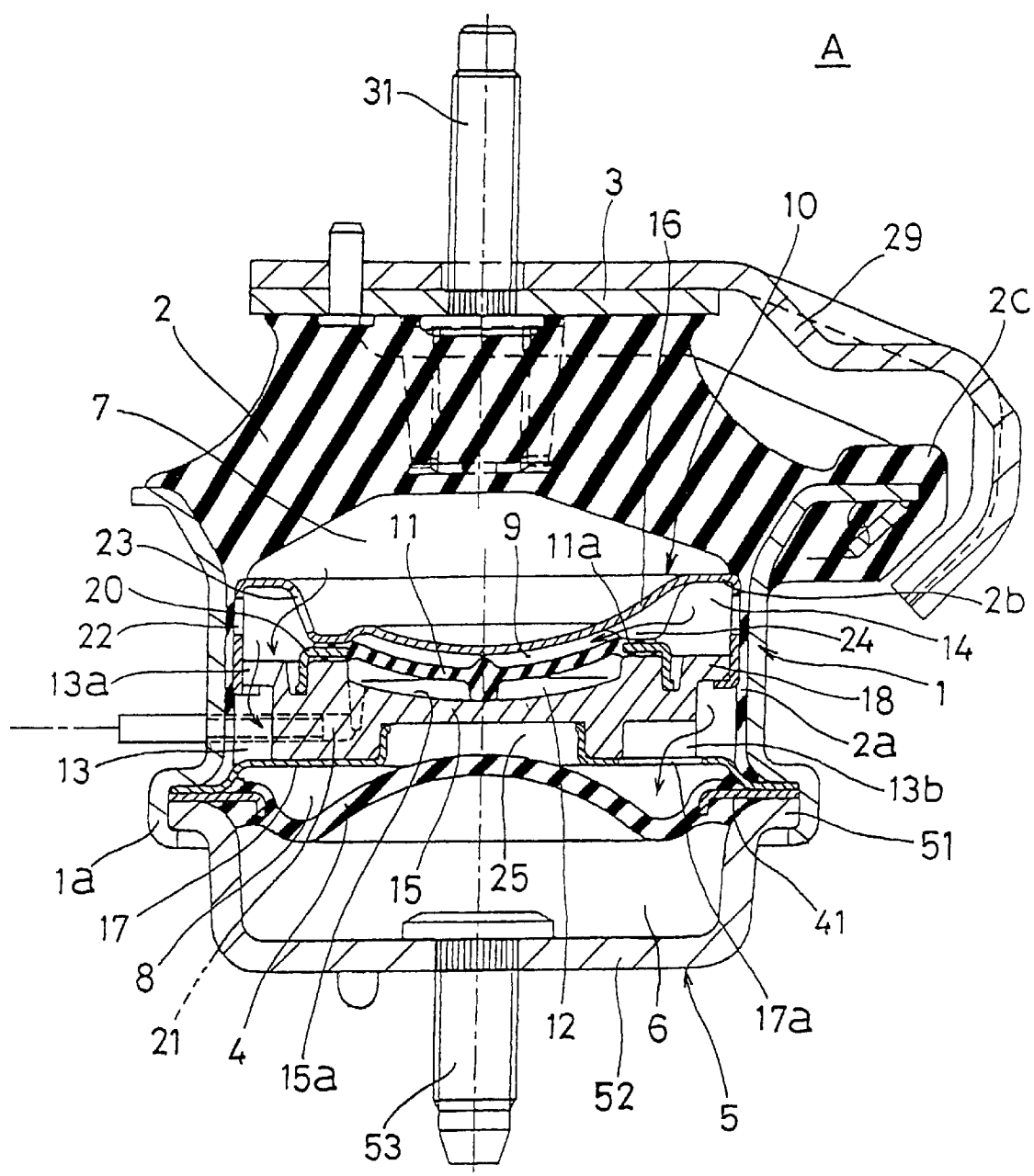
FIG. 1 is a longitudinal sectional view showing one embodiment of the switchably controlled liquid sealed type vibration isolator according to the present invention.

Preferred embodiments of the switchably controlled liquid sealed type vibration isolator according to the present invention will now be described with reference to the drawings but the present invention is not limited to these embodiments.

Referring to FIGS. 1–4, a liquid sealed type vibration isolator A has a vibration isolating base member 2, formed of an elastic rubber member which receives a load of a power unit, such as an engine, etc. The vibration isolating base member 2 is joined to an upper opened side of a cylindrical main metal member 1, and a first metal fixing member 3. That is, the main metal member 1 is joined to the first metal fixing member 3 via the vibration isolating base member 2. In the illustrated vibration isolator A, the vibration isolating base member 2 is formed in a substantially trapezoid-conical shape, and fixed air-tightly at an upper smaller-diameter end portion and a lower larger-diameter outer circumferential portion to the first metal fixing member 3 and the opened portion of the main metal member 1 respectively by a vulcanization bonding device.

A first diaphragm 4, opposed to the vibration isolating base member 2 and formed of a rubber film, and a second metal fixing member 5, covering a an outer side of the first diaphragm 4, are fixed in a sealed state at a lower opened side of the main metal member 1 by a swaging device to be described later. A reference numeral 41 denotes an annular reinforcing member vulcanization bonded to the diaphragm 4.

The first metal fixing member 3 is substantially disc-shaped, and a fixing bolt 31 fixed to a central portion of the first metal fixing member by a press fitting device or a welding device projects upward therefrom, by which fixing bolt 31 the first metal fixing member 3 is secured to a power unit of an automobile.

The second metal fixing member 5 has a substantially cylindrical shape bottom wall portion 52, and a flange-like opened edge portion 51 thereof is swaged with a partition, which will be described later, to a lower end portion 1a of the main metal member 1. The bottom wall portion 52 of the second metal fixing member 5 has a fixing bolt 53 fitted therein by a press fitting device so that the fixing bolt 5 projects downward therefrom. The second metal fixing member 5 is secured to a vehicle body-side member by the fixing bolt 53. A space between the second metal fixing member 5 and first diaphragm 4 is formed as an air chamber 6. This air chamber is communicated with the atmosphere in some cases, and formed as an air-tight chamber in some cases.

A partition 10 is air-tightly fitted in an inner circumference of a portion of the main metal member 1 which is between the vibration isolating base member 2 and first diaphragm 4, via a seal rubber layer 2a integral with the vibration isolating base member 2. An incompressible liquid, such as water or ethylene glycol is sealed in an inner chamber between the vibration isolating base member 2 and the first diaphragm 4. This inner chamber is divided by the partition 10 so as to form a space between the vibration isolating base member 2 and partition 10 as a main liquid chamber 7, and a space between the first diaphragm 4 and partition 10 as a first auxiliary liquid chamber 8. The portion of the partition 10 which is on the side of the main liquid chamber 7 is provided therein with a second auxiliary liquid chamber 9, a change-over chamber 12 which is separated from the second auxiliary liquid chamber 9 by a second diaphragm 11, and which permits an atmospheric pressure and a negative pressure to be introduced thereinto switchably, and first and second orifices 13, 14 which communicate the main liquid chamber 7 with the first and second auxiliary liquid chambers 8, 9 respectively, and which have different liquid passage resistances. In the illustrated embodiment, the first auxiliary liquid chamber 8 communicates with the first orifice 13 having a higher liquid passage resistance (smaller cross-sectional area), and the second auxiliary chamber 9 communicates with the second orifice 14 having a lower liquid passage resistance (larger cross-sectional area).

As shown in FIGS. 1–4, the partition 10 includes a main partition member 15, a partition plate member 16 and a partition receiving plate 17, and has the following structure.

Figure 2:
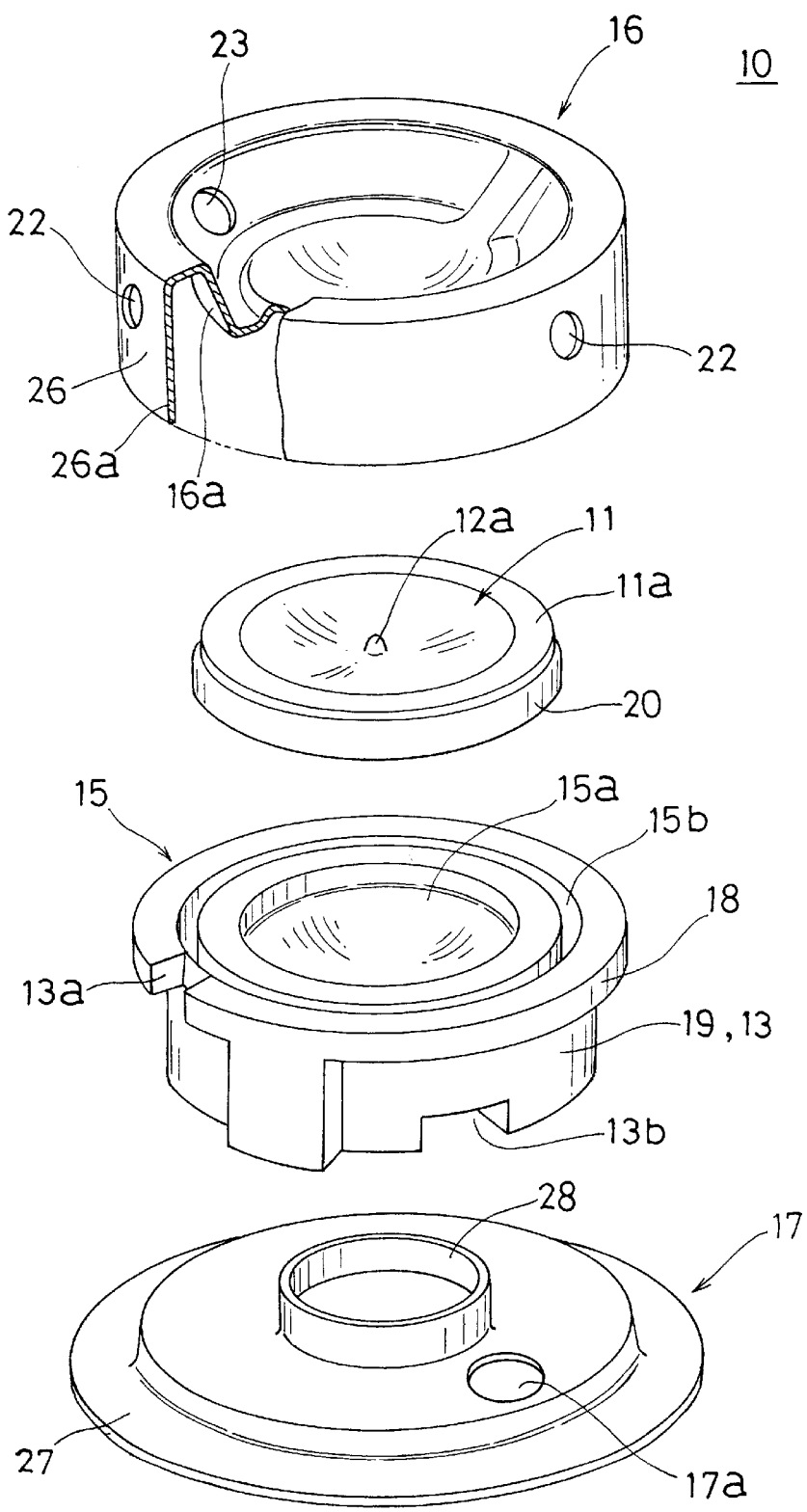
FIG. 2 is a perspective view showing constituent parts, which are in a mutually separated state, of a partition in the same embodiment.
Figure 3:
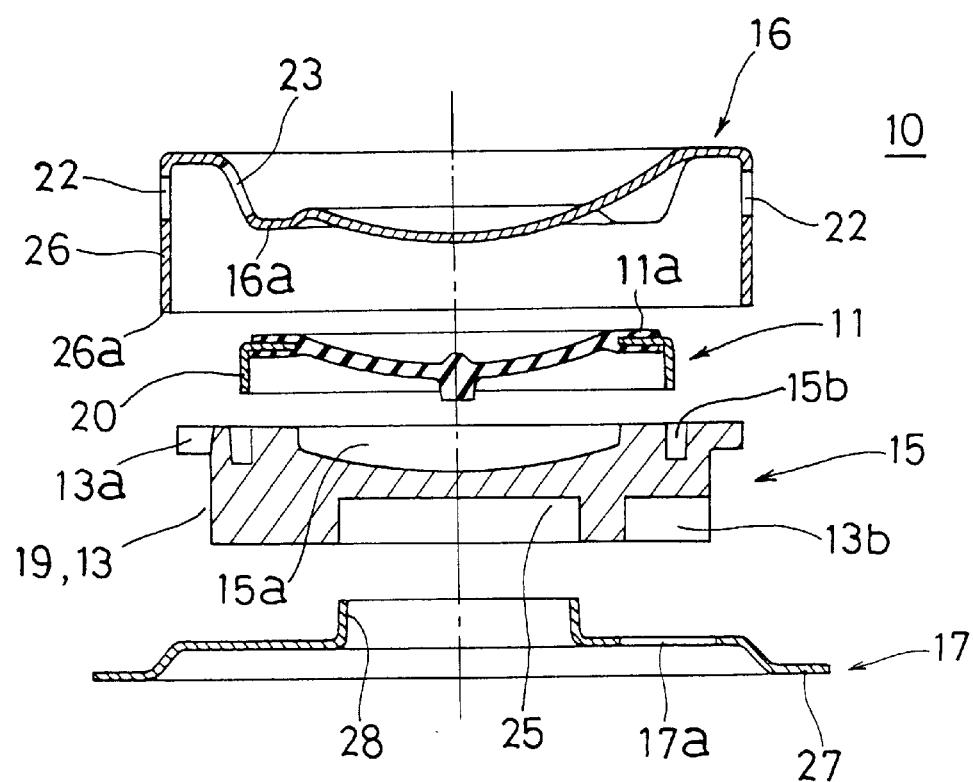
FIG. 3 is a sectional view of the constituent parts of FIG. 2 in a separated state.

The main partition member 15 is made integral of a metal material, such as aluminum, or a rigid material, such as a synthetic resin, and has an annular shape as shown in FIG. 2. The main partition member 15 is provided in a portion of an outer circumference thereof, which is on the side of the first auxiliary liquid chamber 8, with an orifice-forming recess 19 so that a portion 18 on the side of the main liquid chamber 7 remains as a flange-shaped portion. The recess 19 is defined by the partition receiving plate 17 and main metal member 1, whereby the recess 19 is formed as the first orifice 13 which communicates the main liquid chamber 7 and the first auxiliary liquid chamber 8 with each other. The flange-shaped portion 18 is provided with a recessed communication section 13a which communicates the first orifice 13 and main liquid chamber 7 with each other.

An upper inner portion, which is on the side of the main liquid chamber 7, of the main partition member 15 has a second diaphragm 11. An annular metal collar 20 is fixed to an outer circumferential portion of of the second diaphragm 11 by a vulcanization bonding device. The second diaphragm 11 is fixed coaxially with the central axis by press fitting the metal collar 20 into the main partition member 15. A clearance between the second diaphragm 11 and the main partition member 15 is formed as the change-over chamber 12 having a predetermined height. A reference numeral 12a denotes a projection for maintaining the clearance of not smaller than a predetermined height.

In the illustrated embodiment, the central portion of an-upper surface which corresponds to the change-over chamber 12 of the main partition member 15 is recessed curvilineally, and a groove 15b for press fitting the metal collar thereinto is formed around this recessed portion 15a. The second diaphragm 11 is fixed to the main partition member so as to cover the recessed portion 15a by press fitting the metal collar 20 into the groove 15b.

The change-over chamber 12 is joined to a change-over device (not shown), such as a valve, etc. which can be switchably connected to either a negative pressure source or an atmospheric pressure source via a communication passage 21 extending through an inner portion of the main partition member 15 and communicating at a side surface of the main metal member 1 with an outer portion thereof. Thus, either a negative pressure or an atmospheric pressure can be introduced into the change-over chamber 12 by operating the change-over device in accordance with an instruction signal, etc. from a control unit.

As a result of the above arrangement, the second diaphragm 11 can be controlled in a switching manner to an operating condition and a non-operating condition. In order to work mainly the second orifice 14 of a lower liquid passage resistance (larger cross-sectional area), the second diaphragm 11 is maintained in a movable condition. In order to work the first orifice 13 of a higher liquid passage resistance, the movement of the second diaphragm 11 is stopped so as not to operate the second orifice 14 of a larger cross-sectional area. Thus, a sufficient damping effect can be displayed with respect to vibrations in different frequency regions, by the respective orifices 13, 14.

The partition plate member 16 is a pressure molded product formed mainly of a steel plate, and has an annular projection 16a on a lower surface thereof. The partition plate member 16 is fitted firmly in the main liquid chamber 7 and engaged with the main partition member 15, as described below, by a swaging device to engage the outer circumference of the main partition member 15 so as to seal the circumferential edge portion 11a of the second diaphragm 11 against the projection 16a. Thus, a space between the partition plate member 16 and the diaphragm 11 on an inner side of the projection 16a is formed as the second auxiliary liquid chamber 9. A space on an outer side of the second auxiliary liquid chamber 9 and defined by the main partition member 15 and partition plate member 16 forms the second orifice 14 communicating the main liquid chamber 7 and second auxiliary liquid chamber 9 with each other via communication ports 23, 24 and has a comparatively large cross-sectional area. The first orifice 13 communicates with the main liquid chamber 7 through the communication port 23 of the second orifice 14. Namely, the first and second orifices 13, 14 have a common exit with respect to the main liquid chamber 7.

The partition plate member 16 is engaged with and fitted firmly around the main partition member 15 by swaging the outer circumferential portion 26 of the partition plate member 16 into a cylindrical portion of such a diameter that permits a cylindrical bent portion thus formed to be press fitted in the inner circumference of the main metal member 1, fitting firmly the outer circumferential portion 26 around the outer circumference of the flange-shaped portion 18 by swaging into the orifice-forming recess 19 at least a part of the circumferential end section 26a of the outer circumferential portion 26 to thereby swage the circumferential end section 26a to the flange-shaped portion 18.

The swaging of the circumferential end section 26a is done preferably at substantially all parts of the circumference thereof, i.e., over the whole circumferential length of the recess 19 as shown in the drawings but the circumferential end section 26a can also be swaged partially at plural portions thereof spaced from one another at predetermined intervals to the main partition member 15. In this case, the portions to be swaged can be formed like projecting claws which are swaged.

The outer circumferential portion 26 is provided with one or plural circumferentially spaced openings 22 for carrying out easily the replacement of air with a liquid when the partition plate member 16 is incorporated into the main metal member 1. The openings 22 are closed with a seal rubber layer 2a when the outer circumferential portion 26 of the partition plate member 16 is fitted firmly in the inner circumference of the main metal member 1.

The partition receiving plate 17 is a pressure molded product obtained from a steel plate identical with the steel plate mentioned above, having an opening in the central portion thereof and formed of a doughnut-shaped disc of a diameter slightly larger than that of the main partition member 15. The partition receiving plate 17 is positioned on a portion of the main partition member 15 which is on the side of the first auxiliary liquid chamber 8 and an opened edge portion 28 in a central section thereof is press fitted into the recess 25 provided in a lower surface of the main partition member 15. Thus, the outer circumferential edge portion 27 is fixed firmly projecting outward beyond an outer edge of the main partition member 15. In this condition, a recess 13b, continuing from the recess 19, is aligned with an opening 17a so that the first orifice 13 communicates with the first auxiliary liquid chamber 8.

Figure 4:
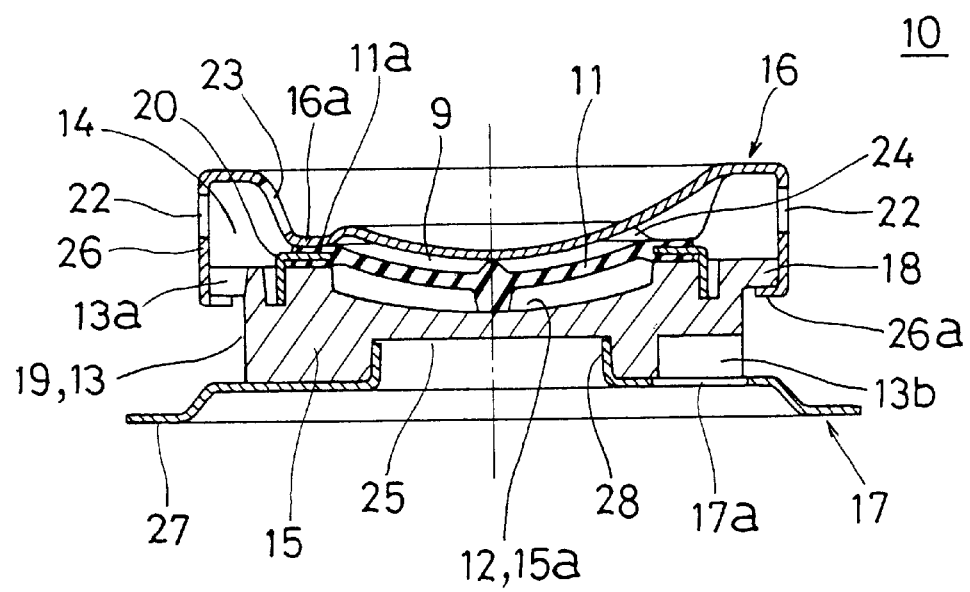
FIG. 4 is a sectional view of the constituent parts of FIG. 2 in an initially assembled state.

In this structure, the partition 10 is in a initially assembled state as shown in FIG. 4, in which the outer circumferential portion 26 of the partition plate member 16 is press fitted liquid-tightly in the inner circumference of the main metal member 1 up to a position in which the outer circumferential portion 26 engages a circumferential edge portion 2b of the surface (lower surface in FIG. 1) on the side of the main liquid chamber 7 of the vibration isolating base member 2. In addition, the outer circumferential edge portion 27 of the partition receiving plate 17, the first diaphragm 4 having the reinforcing member 41, and opened edge portion 51 of the second metal fixing member 5 are swaged together using the lower end portion 1a of the main metal member 1.

In the case of the illustrated embodiment, a larger diameter portion of the vibration isolating base member 2 has, at a part of a circumferential section thereof, a projection 2c reinforced with a part of the main metal member 1. A stabilizer 29, fixed to the first metal fixing member 3 with a common tightening member, is disposed so as to extend near upper and lower surfaces of the projection 2c, and function as a stopper for restricting excessive vertical displacement of the projection 2c.

In order to assemble the liquid sealed type vibration isolator A constructed as described above, the metal collar 20 is press fitted into the press fitting groove 15b first, in the recess 15a in the upper surface of the main partition member 15 while in air, whereby the second diaphragm 11 is fixed so as to form the change-over chamber 12 between the second diaphragm 11 and main partition member 15. The partition plate member 16 is press fitted in an engaged state at the outer circumferential portion 26 thereof around the outer circumference of the flange-shaped portion 18 of the main partition member 15, and swaged thereto by a swaging member provided at the circumferential end section 26a of the outer circumferential portion 26. Thus, the circumferential edge portion of the second diaphragm 11 is pressed by the projection 16a of the partition plate member 16, and the second auxiliary liquid chamber 9 and second orifice 14 are formed. The partition receiving plate 17 is fixed fly at the press fitting portion in the central portion thereof to a lower side portion of the main partition member 15 which is on the side of the first auxiliary liquid chamber 8, whereby the partition 10 is tentatively assembled as shown in FIG. 4. During this time, the parts can be positioned as the positions of the orifice-forming openings and communication ports are ascertained visually with ease, and the tentative combining of the parts can be done reliably and easily without the parts being misplaced.

Next, the partition 10 assembled tentatively as described above is press fitted and combined in a liquid tank into and with the main metal member 1, which is vulcanization bonded to the vibration isolating base member 2 into a unitary body, as the air is discharged. During this time, the outer circumferential portion 26 of the partition plate member 16 is press fitted firmly and liquid-tightly in the inner circumference of the main metal member 1 via the seal rubber layer 2a up to the position in which the outer circumferential portion 26 engages the circumferential edge portion 2b of the main liquid chamber-side surface (lower surface in the drawings) of the vibration isolating base member 2. After the air is extracted, the outer circumferential edge portion 27 of the partition receiving plate 17, a portion of the first diaphragm 4 including the reinforcing member 41, and the opened edge portion 51 of the second metal fixing member 5 are clamped together by swaging the lower end portion 1a of the main metal member 1. A liquid entering the change-over chamber 12 is discharged by taking out the same from the liquid tank. A rubber plug is inserted into the communication passage 21 before the assembling of the vibration isolator so the change-over chamber 12 may be used by removing the rubber plug after the liquid is taken out from the liquid tank.

Accordingly, the switchably controlled liquid sealed type vibration isolator A of FIG. 1 is assembled easily and is formed so that a movement of the second diaphragm 11 on the side of the second auxiliary chamber 9 can be switchably controlled to a moving condition and a non-moving condition by a switching regulating operation introducing a negative pressure and an atmospheric pressure into the change-over chamber 12, which is provided along with the main liquid chamber 7, first and second auxiliary liquid chambers 8, 9, first and second orifices 13, 14, and first and second diaphragms 4, 11, and which is adjacent to the second auxiliary liquid chamber 9 joined to the second orifice 11 of a lower liquid passage resistance.

In the vibration isolator thus assembled, the partition plate member 16 which presses the second diaphragm 11 to form the second auxiliary liquid chamber 9 and second orifice 14 is fitted firmly in an engaged state around the outer circumference of the main partition member 15 by a swaging device for the same outer circumference. Therefore, the main partition member 15 and partition plate member 16 are combined together thus preventing their being separated from each other, and the second diaphragm 11 is retained in a pressed state reliably. Accordingly, even when the fluctuation of the liquid pressure ascribed to the vibration of the vibration isolating base member 2, and permanent set in fatigue of parts due to heat occur, there is not the possibility that the deficiency of the sealability of parts and the short-circuiting of orifices occur.

Figure 5:
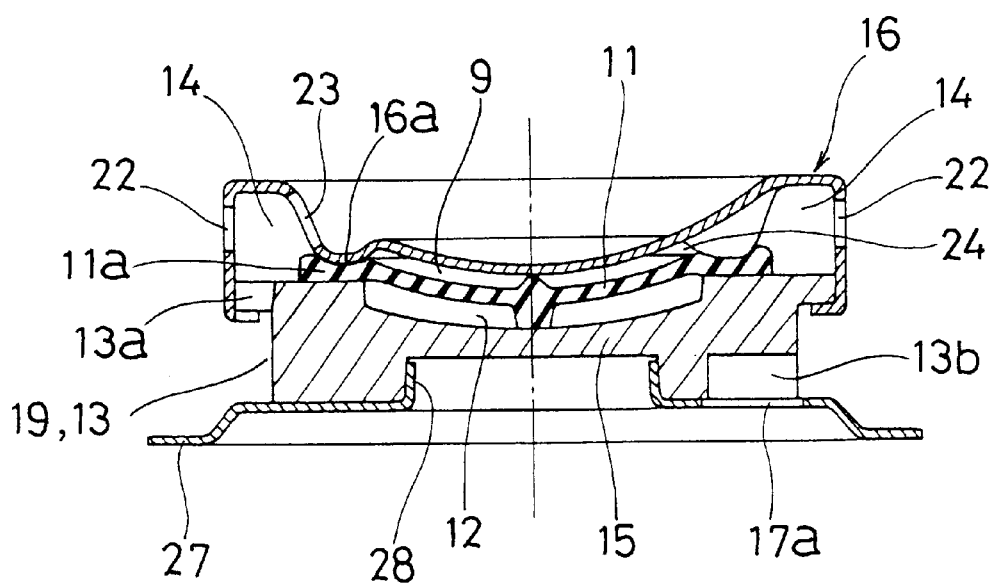
FIG. 5 is a sectional view of a partition in another embodiment of the present invention.

When the partition plate member 16 is swaged to the main partition member 15 as mentioned above, the circumferential edge portion of the second diaphragm 11 can be held in a clamped state between the projection 16a and the main partition member 15. Therefore, as shown in, for example, FIG. 5, this vibration isolator can also be practiced by clamping the circumferential edge portion of the second diaphragm 11 by the projection 16a and main partition member 15 with the metal collar 20 of the second diaphragm 11 omitted.

As described above, in the switchably controlled liquid sealed type vibration isolator according to the present invention, the inner partition dividing the inner chamber into the main liquid chamber 7 and two auxiliary liquid chambers 8, 9, is formed so that the partition 10 can be assembled initially in the air. This enables the plural constituent parts to be combined together reliably and easily without the parts being mislocated. Furthermore, relative displacement of the constituent parts in a vehicle-mounted state due to the variation thereof and the lapse of time is reduced, and the sealed condition of the parts is maintained in excellent condition, and contributes to the improvement of the durability of the vibration isolator.

What is claimed is:

1. A switchably controlled liquid sealed type vibration isolator comprising:
   a vibration isolating base member formed of an elastic rubber member,
   a first metal fixing member combined with one of upper and lower portions of the vibration isolating base member,
   a main cylindrical metal member combined with the other portion of the vibration isolating base member,
   a first diaphragm fixed to the main cylindrical metal member so as to be opposed to the vibration isolating base member,
   a partition provided between the vibration isolating base member and the first diaphragm,
   a main liquid chamber formed between the partition and the vibration isolating base member,
   a first auxiliary liquid chamber formed between the partition and the first diaphragm,
   a second auxiliary liquid chamber formed in a side portion of the partition,
   first and second orifices communicating the main liquid chamber with the first and second auxiliary chambers respectively,
   the partition having a main partition member having an outer circumferential portion defining the first orifice,
   a second diaphragm being provided on a main liquid chamber-side portion of the main partition member so as to form a change-over chamber in a diametrically inner portion thereof, the change-over chamber being separated from the second auxiliary chamber via the second diaphragm and configured to accept an atmospheric pressure and a negative pressure in a switchable manner,
   a partition plate member which presses a circumferential portion of the second diaphragm toward the main partition member to form the second auxiliary liquid chamber between the partition plate member and the second diaphragm, the partition plate member being engaged around an outer circumferential portion of the main partition member by swaging,
   a portion defined by the main partition member and partition plate member on an outer side of the second auxiliary liquid chamber being formed as the second orifice,
   a partition receiving plate having an outer circumferential edge portion which extends outward beyond an outer end of the main partition member being press fit fixed to the main partition member on a side facing the first auxiliary liquid chamber, the partition plate member being fitted liquid-tightly in an inner circumferential portion of the main metal member, the outer circumferential edge portion of the partition receiving plate being fixed along with the first diaphragm to the main metal member by swaging.

2. The switchably controlled liquid sealed type vibration isolator according to claim 1, further comprising a second metal fixing member covering an outer side of the first diaphragm, the second metal fixing member being fixed along with the partition receiving plate and the first diaphragm to the main metal member.

3. The switchably controlled liquid sealed type vibration isolator according to claim 1 or 2, wherein the main partition member is provided on the portion of an outer circumference thereof which is on the side of the first auxiliary liquid chamber with an orifice-forming recess, which is defined by the partition receiving plate and the main metal member to form the first orifice.

4. The switchably controlled liquid sealed type vibration isolator according to claim 3, wherein the partition plate member is fitted firmly at an outer circumferential portion thereof around an outer circumference of the portion of the main partition member which is on the side of the main liquid chamber, at least a part of a circumferential end portion of the partition plate member being bent in the orifice-forming recess in the inward direction and thereby swaged to the main partition member.

5. The switchably controlled liquid sealed type vibration isolator according to claim 4, wherein the circumferential end portion of the partition plate member is swaged at plural circumferentially spaced parts thereof to the main partition member.

6. The switchably controlled liquid sealed type vibration isolator according to claim 4, wherein the circumferential end portion of the partition plate member is swaged at substantially all circumferential parts thereof to the main partition member.

7. The switchably controlled liquid type vibration isolator according to claim 1 or 2, wherein the first diaphragm includes an annular reinforcing plate at a periphery thereof which is fixed along with the partition receiving plate.

8. The switchably controlled liquid sealed type vibration isolator according to claim 7, wherein said main cylindrical metal member is swaged to fix the annular reinforcing plate along with the partition receiving plate.

9. The switchably controlled liquid sealed type vibration isolator according to claim 1, wherein said main cylindrical metal member is swaged to fix the first diaphragm along with the partition receiving plate.

10. A vibration isolator comprising:
    a fitting member having a first portion for attachment to a body and a second portion;
    an elastic base member having a first side fixed to the second portion of the fitting member and a second side;
    a tubular member having a first end fixed to the second side of the elastic base member and a second end;
    a partition device, disposed in the tubular member, having an outer diameter, a first partition side opposing the elastic base member defining a main liquid chamber therebetween, and a second partition side opposite said first partition side, said partition device defining an orifice communicating with the main liquid chamber;
    a partition receiving plate having a diameter greater than the outer diameter of the partition device and having the partition device mounted thereon, the partition receiving plate having an annular portion extending beyond the outer diameter of the partition device, the partition receiving plate having an opening communicating with the orifice;
    a diaphragm disposed opposing the partition receiving plate and defining an auxiliary liquid chamber communicated with the main liquid chamber via said orifice;
    said annular portion of the partition receiving plate and said diaphragm being fixed in place together by said second end of the tubular member swaged to clamp said annular portion and said diaphragm; and another fitting member for attachment to a second body, the another fitting member having a flange clamped together with said annular portion and said diaphragm by said second end of the tubular member, wherein said partition device includes a main partition member and a partition plate, said partition plate forming the first partition side, defining an opening for the orifice to communicate with the main liquid chamber, and having side portions fixed to a peripheral side of the main partition member and contacting an inner circumferential surface of the tubular member to seal the main liquid chamber with the exception of the orifice.

11. The vibration isolator of claim 10 herein the peripheral side of the main partition member has recesses and said side portions of the partition plate are swaged into said recesses.

12. The vibration isolator according to claim 11, wherein the diaphragm includes an annular reinforcing plate at a periphery thereof which is fixed along with the partition receiving plate.

13. A vibration isolator comprising:

a fitting member having a first portion for attachment to a body and a second portion;

an elastic base member having a first side fixed to the second portion of the fitting member and a second side;

a tubular member having a first end fixed to the second side of the elastic base member and a second end;

a partition device, disposed in the tubular member, having an outer diameter, a first partition side opposing the elastic base member defining a main liquid chamber therebetween, and a second partition side opposite said first partition side, said partition device defining an orifice communicating with the main liquid chamber;

a partition receiving plate having a diameter greater than the outer diameter of the partition device and having the partition device mounted thereon, the partition receiving plate having an annular portion extending beyond the outer diameter of the partition device, the partition receiving plate having an opening communicating with the orifice;

a diaphragm disposed opposing the partition receiving plate and defining an auxiliary liquid chamber communicated with the main liquid chamber via said orifice; and said annular portion of the partition receiving plate and said diaphragm being fixed in place together by said second end of the tubular member swaged to clamp said annular portion and said diaphragm, wherein said partition device includes a main partition member and a partition plate, said partition plate forming the first partition side, defining an opening for the orifice to communicate with the main liquid chamber, and having side portions fixed to a peripheral side of the main partition member and contacting an inner circumferential surface of the tubular member to seal the main liquid chamber with the exception of the orifice.

14. The vibration isolator of claim 13 wherein the peripheral side of the main partition member has recesses and said side portions of the partition plate are swaged into said recesses.

15. The vibration isolator according to claim 14, wherein the diaphragm includes an annular reinforcing plate at a periphery thereof which is fixed along with the partition receiving plate.

16. A vibration isolator comprising:

a fitting member having a first portion for attachment to a body and a second portion;

an elastic base member having a first side fixed to the second portion of the first fitting member and a second side;

a tubular member having a first end fixed to the second side of the elastic base member and a second end;

a partition device, disposed in the tubular member, having an outer diameter, a first partition side opposing the elastic base member defining a main liquid chamber therebetween, and a second partition side opposite said first partition side, said partition device defining an orifice communicating with the main liquid chamber;

said partition device including a main partition member and a partition plate, said partition plate forming the first partition side, defining an opening for the orifice to communicate with the main liquid chamber, and having side portions fixed to a peripheral side of the main partition member and contacting an inner circumferential surface of the tubular member to seal the main liquid chamber with the exception of the orifice;

a diaphragm disposed opposing the second partition side and defining an auxiliary liquid chamber communicated with the main liquid chamber via said orifice;

another fitting member for attachment to a second body, the another fitting member being disposed opposing said diaphragm to define a control pressure chamber; and said second end of said tubular member, said diaphragm, and said another fitting member being mutually fixed in place together, wherein the peripheral side of the main partition member has recesses and said side portions of the partition plate are swaged into said recesses.

17. The vibration isolator of claim 16 wherein the partition device further includes a partition flange having a diameter greater than an outer diameter defined by said side portions of said partition plate, said partition flange being mutually fixed together along with said second end of said tubular member, said diaphragm, and said another fitting member.

18. The vibration isolator according to claim 17, wherein said second end of the tubular member is swaged to clamp said partition flange, said diaphragm, and said another fitting member together.

19. The vibration isolator according to claim 16, wherein said second end of the tubular member is swaged to clamp said diaphragm, and said another fitting member together.

* * * * *